United States Patent [19]
Deutschmann et al.

[11] Patent Number: 4,572,148
[45] Date of Patent: Feb. 25, 1986

[54] DIESEL INTERNAL COMBUSTION ENGINE

[75] Inventors: Herbert Deutschmann, Friedrichshafen; Erhard Schmidt, Oberteuringen; Gerd-Michael Wolters, Markdorf, all of Fed. Rep. of Germany

[73] Assignee: MTU Motoren- und Turbinen-Union Friedrichshafen GmbH, Fed. Rep. of Germany

[21] Appl. No.: 629,582

[22] Filed: Jul. 11, 1984

[30] Foreign Application Priority Data

Jul. 14, 1983 [DE] Fed. Rep. of Germany ....... 3325393

[51] Int. Cl.[4] .............................................. F02B 33/02
[52] U.S. Cl. .................. 123/559; 123/198 F; 60/605; 60/627
[58] Field of Search .......... 123/198 F, 2, 559; 60/605, 627, 628

[56] References Cited

U.S. PATENT DOCUMENTS

| | | | |
|---|---|---|---|
| 4,191,152 | 3/1980 | Deutschmann | 123/198 F |
| 4,248,198 | 2/1981 | Deutschmann et al. | 123/198 F |
| 4,250,850 | 2/1981 | Ruyer | 123/198 F |
| 4,359,979 | 11/1982 | Dolza | 123/198 F |
| 4,455,984 | 6/1984 | Merzini et al. | 123/198 F |

Primary Examiner—Ira S. Lazarus
Attorney, Agent, or Firm—Craig & Burns

[57] ABSTRACT

A diesel internal combustion engine in which during the starting and partial load operation, a number of the cylinders are operated as compressor cylinders and a number as engine cylinders. The supplied charging air of one compressor cylinder (26) is used as actuating medium for the valves (35 to 42) which are to be controlled corresponding to the operating condition of the internal combustion engine, in the connecting lines (27 to 34) between the compressor cylinders (19 to 26) and the engine cylinders (11 to 18) in the absence of a compressed air network. As a result thereof, auxiliary energy of the internal combustion engine (10) is needed only for the initiating control and a rapid shifting of the operating conditions is attained with minimum expenditures.

4 Claims, 1 Drawing Figure

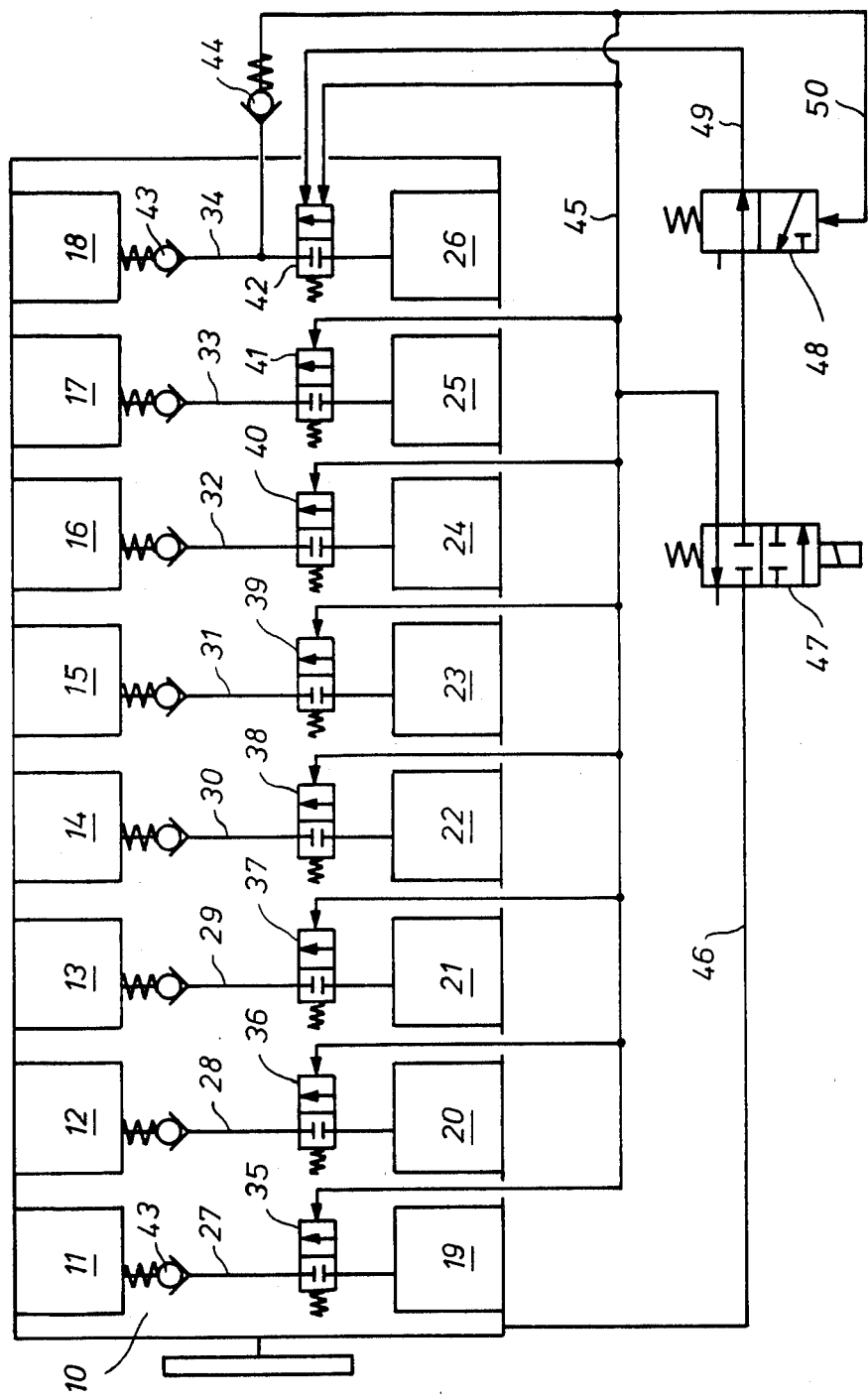

DIESEL INTERNAL COMBUSTION ENGINE

The present invention relates to an exhaust gas turbocharged diesel internal combustion engine with a low compression ratio, in which during the starting and in the partial load operation several engine cylinders are charged by at least an equal number of compressor cylinders by way of connecting lines adapted to be closed by valves.

The ignition friendliness of the injected fuel is attained by this measure in case of an inadequate exhaust gas turbocharging during the starting and a good combustion in the cylinder combined with a low emission of harmful components of the exhaust gas is assured in the partial load operation.

For shifting the operation of the internal combustion engine from the start and partial load operation to the middle and full load operation and vice versa, valves actuatable by compressed air in the connecting lines are known in the prior art. This actuating energy already exists anyhow in many installations; it therefore can be utilized advantageously and permits a rapid shifting of the operating ranges. However, problems occur if no air pressure system is available. The remaining auxiliary energies present in the internal combustion engine, such as lubricating oil pressure or electricity, as a rule are not available or available only inadequately, require a large amount of space, entail a great expenditure and/or shift too slowly.

It is therefore the object of the present invention to provide an effective type of actuation for these valves in case of a missing air pressure system.

The underlying problems are solved according to the present invention in that the valves which control the connecting lines corresponding to the operating condition of the internal combustion engine, are actuated by the supplied charging air of at least one compressor cylinder.

This becomes possible in an advantageous manner in that the valve of a connecting line is actuated by auxiliary energy of the internal combustion engine, in that this connecting line is connected with all valves for the actuation by way of a check valve and in that after the shifting of the valves the auxiliary energy acting on the valve of the connecting line is again disconnected.

The advantage of the present invention resides in that auxiliary energy has to be readied only for one valve, in that the remaining valves in the construction can be left to compressed air actuation and in that the shifting time can be kept small.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of a control arrangement according to the present invention of the valve actuation for a diesel internal combustion engine.

The FIGURE schematically illustrates a control according to the present invention of the valve actuation for a diesel internal combustion engine 10 with sixteen cylinders 11 to 26. In the starting operation and partial load operation, the cylinders 11 to 18 operate as engine cylinders which are charged by the compressor cylinders 19 to 26. Connecting lines 27 to 34 are arranged between the individual engine cylinders and their associated compressor cylinders, which are controlled by valves 35 to 42 corresponding to the operating condition of the internal combustion engine. Additionally, one check valve 43 each is arranged in each of the connecting lines 27 to 34. The valves 35 to 42 are actuated by the pressure of the charging air of the compressor cylinder 26 in the connecting line 34, which acts as control pressure on the valves by way of a check valve 44 and a line 45.

For the initiation of the starting, respectively, partial load-condition, for example, the lubricating oil pressure of the internal combustion engine serves as auxiliary energy, which acts on the valve 42 by way of a line 46, an electromagnetically actuated control valve 47, a venting valve 48 and a line 49. During the first compression stroke of the piston of the compressor cylinder 26, all valves 35 to 42 are actuated thereby by way of the connecting line 34, check valve 44 and line 45. A closing of the valves with a decrease of the compression pressure is prevented by the check valve 44. At the same time, the venting or relief valve 48 is actuated by way of a control line 50 which blocks off the lubricating oil pressure and relieves or vents the line 49. As a result thereof, all of the valves 35 to 42 are kept open by the compression pressure in the line 45.

For shifting to the operation in the middle partial loads up to full load operation, the electromagnet of the control valve 47 is de-energized and the control valve is forced into the illustrated position by spring force. As a result thereof, the line 45 is vented or relieved and all of the valves 35 to 42 are closed impact-like. Owing to fuel injection into the cylinders 19 to 26, the latter then also operate as engine cylinders.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An exhaust gas turbocharged diesel internal combustion engine having a relatively low compression ratio, comprising cylinder means, several of said cylinder means which operate as engine cylinders during the starting and in the partial load operation, being charged by at least an equal number of cylinder means operating as compressor cylinders by way of connecting lines operable to be closed off by valve means, and control means for actuating said valve means, said control means being operable to control the connecting lines by the supplied charging air of at least one compressor cylinder corresponding to the operating condition of the internal combustion engine.

2. An internal combustion engine according to claim 1, wherein one of said valve means of one connecting line is actuated by an auxiliary energy of the internal combustion engine, said one connecting line being operatively connected by way of a check valve with all the valve means for the actuation thereof, the auxiliary energy acting on the one valve means of said one connecting line being again rendered ineffectual after the shifting of the valve means.

3. An exhaust gas turbocharged diesel internal combustion engine having a relatively low compression ratio, comprising cylinder means, several of said cylinder means which operate as engine cylinders during the starting and in the partial load operation, being charged by at least an equal number of cylinder means operating as compressor cylinders by way of connecting lines operable to be closed off by valve means, and control means for actuating said valve means, said control means being operable to open the valve means upon pressure in at least one compressor cylinder reaching a predetermined value.

4. An internal combustion engine according to claim 3, wherein one of said valve means of one connecting line is actuated by an auxiliary energy of the internal combustion engine, said one connecting line being operatively connected by way of a check valve with all the valve means for the actuation thereof, the auxiliary energy acting one the one valve means of said one connecting line being again rendered ineffectual after the shifting of the valve means.

* * * * *